(12) United States Patent
Stubberud et al.

(10) Patent No.: US 11,590,940 B2
(45) Date of Patent: Feb. 28, 2023

(54) REMOTE OPERATING LEVER UNIT FOR OPERATING BRAKE UNIT, BRAKE SYSTEM, AND METHOD OF REPOSITIONING LEVER

(71) Applicant: RollerSafe AS, Son (NO)

(72) Inventors: Atle Stubberud, Son (NO); Henrik Karlstad, Son (NO); Anders Skaarud, Son (NO)

(73) Assignee: RollerSafe AS, Son (NO)

( * ) Notice: Subject to any disclaimer, the term of this patent is extended or adjusted under 35 U.S.C. 154(b) by 404 days.

(21) Appl. No.: 16/845,409

(22) Filed: Apr. 10, 2020

(65) Prior Publication Data

US 2020/0331440 A1 Oct. 22, 2020

(30) Foreign Application Priority Data

Apr. 17, 2019 (GB) ..................... 1905478

(51) Int. Cl.
  *B60T 7/08* (2006.01)
  *B60T 13/74* (2006.01)
  *B62L 3/02* (2006.01)

(52) U.S. Cl.
  CPC ............ *B60T 7/085* (2013.01); *B60T 13/741* (2013.01); *B62L 3/02* (2013.01); *B60T 2270/82* (2013.01)

(58) Field of Classification Search
  CPC .... B60T 7/085; B60T 13/741; B60T 2270/82; B62L 3/02; B62K 23/06
  See application file for complete search history.

(56) References Cited

U.S. PATENT DOCUMENTS

| 4,318,307 A | 3/1982 | Kine |
| 4,611,500 A | 9/1986 | Nagano |
| 4,945,785 A | 8/1990 | Romano |
| 5,660,082 A | 8/1997 | Hsieh |
| 5,896,779 A | 4/1999 | Biersteker et al. |

(Continued)

FOREIGN PATENT DOCUMENTS

| CN | 201240478 | 5/2009 | |
| DE | 202015002450 U1 * | 7/2015 | ............ B60T 13/741 |

(Continued)

OTHER PUBLICATIONS

The extended European search report issued in corresponding European Application No. 20159533.7, dated Aug. 3, 2020, 10 pages provided.

(Continued)

*Primary Examiner* — Thomas C Diaz (74) *Attorney, Agent, or Firm* — Hamre, Schumann, Mueller & Larson, P.C.

(57) ABSTRACT

A remote operating lever unit (20) for operating a brake unit (10) mounted to an wheeled vehicle is provided a lever (22) for operation by a user, a main body (24) holding the lever (22) in a displaceable manner and including a control unit for transmitting a signal to the brake unit (10) based on a displacement amount of the lever (22) from a neutral position thereof, a holder (26) holding the main body (26), and a connecting portion (245, 265) detachably engaging the main body (24) and the holder (26) at an arbitrary angle around an axis (X) perpendicular to a plane in which the lever (22) displaces.

19 Claims, 8 Drawing Sheets

(56) References Cited

U.S. PATENT DOCUMENTS

| | | |
|---|---|---|
| 2006/0130604 A1 | 6/2006 | Volpe |
| 2009/0229927 A1 | 9/2009 | Brioschi |
| 2010/0194187 A1 | 8/2010 | Howard |
| 2012/0255390 A1 | 10/2012 | Warren et al. |

FOREIGN PATENT DOCUMENTS

| | | | | |
|---|---|---|---|---|
| DE | 102014207760 A1 | | 10/2015 | |
| EP | 2 489 562 | | 8/2012 | |
| EP | 2489562 A1 | * | 8/2012 | ................ B60T 7/16 |
| EP | 2489562 A1 | | 8/2012 | |
| FR | 557018 A | | 8/1923 | |
| FR | 893566 A | | 8/1944 | |
| FR | 3025175 A1 | * | 3/2016 | ............. B62K 23/06 |
| JP | 2013-177096 | | 9/2013 | |
| WO | WO-2011010865 A2 | * | 1/2011 | ................ B60T 7/02 |
| WO | WO-2011120124 A1 | * | 10/2011 | ............ B60L 11/007 |

OTHER PUBLICATIONS

Office Action issued in corresponding GB Application No. 1905478.2 filed Apr. 17, 2019, 5 pages.

* cited by examiner

REMOTE OPERATING LEVER UNIT FOR OPERATING BRAKE UNIT, BRAKE SYSTEM, AND METHOD OF REPOSITIONING LEVER

FIELD OF THE INVENTION

The invention relates to the field of wheeled vehicles and, more particularly to a remote operating lever unit for operating a brake unit mounted to wheeled vehicles.

BACKGROUND OF THE INVENTION

Vehicles designed for travel, in particular those comprising wheels, generally require means for controlling the speed with which the wheeled vehicle is traveling. Such vehicles include those that are powered by human interaction or those which are assisted by a motor, such as trikes, handbikes, bicycles, wheelchairs or the like.

A typical brake system used for such wheeled vehicles includes a brake device that applies a braking force to the wheel of the wheeled vehicle, and an operating lever unit for operating the brake device that is connected the brake device via a brake wire. In a bicycle brake system, for example, the operating lever unit is mounted to a handlebar of the bicycle in a position where a user can easily grip said operating lever.

One difficulty that is associated with these systems, however, is adjustment of a neutral position of the lever of the operating lever unit with respect to the handlebar of the bicycle. Such adjustment is required, for example, when the brake wire elongates after using for a long time or with very heavy use. In case of elongation of the brake wire, the distance between the lever and the handlebar changes, whereby an appropriate braking force cannot be obtained. Another situation in which it is required to adjust the neutral position of the lever, is when the distance between the lever and the handlebar no longer fits with the size of the user's hand as the user grows or as the user changes.

In order to adjust the distance between the brake lever and the handlebar, it would be necessary to change the length of the brake wire connecting a brake caliper of the brake device and the brake lever attached to the handlebar.

Several attempts to improve the workability in the adjustment of the lever position have been proposed. U.S. Pat. No. 5,660,082 A discloses a brake lever system including a cable attachment fitting which rides within an open slot of a brake lever body which tilts away from the departure point of the brake cable as a brake lever body is pivoted away from a brake lever housing. A threaded screw, or rod, carried within the open slot, can be adjusted to raise or lower the height of a rectangular block which forms an adjustable lower limit below which the cable attachment fitting cannot travel.

U.S. Pat. No. 4,611,500 A discloses a brake lever reach adjustment which includes a bracket, a brake lever and a reach adjusting assembly. The bracket to be mounted to a handlebar has a cavity therein. The brake lever is pivotally connected to the bracket, and defines two opposite wings. The reach adjusting assembly has a lead screw and a movable block mounted about the lead screw. The movable block selectively supports one of the two wings, or is positioned between the two wings to adjust a position of the brake lever relative to the handlebar.

In both of the documents described above, however, the extent to which the lever can be adjusted is at most several millimeters. Therefore, if a user desires more adjustment, it would be necessary to release an end of the brake wire fixed to the brake device using a hexagonal wrench or special tools, adjust the length of the brake wire, and tighten it again. Such work requires labour and certain experience in brake maintenance.

For this reason, the conventional brake levers disclosed in the documents above, are not suitable when it is required to adjust the lever to a large degree, as the user grows up or the user changes for example. In some cases, it may be necessary to change the brake lever itself to a new one which fits to the user's hand.

It is therefore an object of the present invention to provide a remote operating lever unit and brake system which can be easily repositioned to meet different hand sizes, different grip reach sizes of the user and different grip strengths.

SUMMARY OF THE INVENTION

This object is achieved by the remote operating lever unit of claim 1 and by the brake system of claim 12.

The invention provides a remote operating lever unit for operating a brake unit mounted to a wheeled vehicle. The wheeled vehicle comprises a body and one or more wheels mounted to the body. The remote operating lever unit comprises a lever for operation by a user, a main body holding the lever in a displaceable manner and including a control unit for transmitting a signal to the brake unit based on a displacement amount of the lever from a neutral position thereof, a holder holding the main body, and a connecting portion detachably engaging the main body and the holder at an arbitrary angle around an axis perpendicular to a plane in which the lever displaces.

This arrangement allows a user of the wheeled vehicle to easily reposition the neutral position of the lever to meet different hand sizes; this repositioning may be achieved by detaching the main body and the holder and reattaching the main body and the holder via the connection portion at an arbitrary angle around the axis perpendicular to the plane in which the lever displaces.

In a further arrangement, the connecting portion preferably includes a protruding part provided at one of the holder and the main body along the axis and having one or more male splines on an outer peripheral surface thereof, and a recessed part for receiving the protruding part, the recessed part being provided at the other of the holder and the main body along the axis and having one of more female splines sized and shaped to engage with the male splines on an inner peripheral surface thereof.

This is advantageous as it allows a user to easily engage the main body with the holder at preferable angle. Further, the protruding part and recessed part are easy to form. In a preferred arrangement, the protruding part is formed integrally with the holder or the main body; and the recessed part is formed integrally with the main body or the holder.

In a further arrangement, the lever preferably comprises the neutral position, a brake operation position where the lever is displaced in a first direction from the neutral position by a user, and a park brake position where the lever is displaced in a second direction opposite to the first direction. Preferably, the control unit of the remote operating lever unit transmits a signal for turning on a parking brake or parking brake functionality to the brake unit when the lever is set to the park brake position.

This allows a user to set up easily on the park brake position. Also, since the park brake position is on the other side of the braking operating side, it is prevented that a user erroneously activates the parking brake during ride.

Yet another arrangement preferably comprises a calibration means for calibrating the signal to be generated based on the displacement amount of the lever from the neutral position, taking a change of a movable range of the lever from the neutral position to a full brake position as a result of adjustment of the neutral position of the lever via the connecting portion, into account.

This arrangement allows to obtain a desired braking force at the brake unit according to the lever operation amount even after the lever is repositioned, i.e., the movable range of the lever from the neutral position to the full brake position is changed.

Preferably, the remote operating lever unit may comprise a relative detecting means for detecting a positional relationship around the axis perpendicular to the plane in which the lever displaces, between the main body and the holder. A change of the positional relationship indicates the change of the movable range of the lever.

More preferably, the relative position detecting means comprises one or more first electrical contacts provided at the main body (24) and one or more second electrical contacts provided at the holder (26), and the relative position is detected by the control unit, depending on which first contact and which second contact are connected.

In a further arrangement, the holder preferably comprises a lock portion which is engaged with an outer surface of the main body and maintains a connection state between the main body and the holder via the connecting portion.

This ensures a reliable jointed state between the main body and holder via the connecting portion.

In a further arrangement, the control unit preferably comprises an accelerometer. The control unit is preferably configured to transmit a signal for turning on a parking brake or parking brake functionality to the brake unit when an output signal from the accelerometer does not substantially change, or does not exceed a predetermined threshold, over a predetermined amount of time. In a case the wheeled vehicle has been standing still for a while, the brake unit will automatically turn on the parking brake. This function comes in handy in many situations, and especially for the companion that may need to the vehicle to stand still while helping the user and may have forgotten to activate the park brake.

In a further arrangement, the main body preferably comprises a variable resistive element to adjust a lever resistance to pulling. Preferably, the variable resistive element includes a pair of friction elements and a variable pressure means for applying a contact pressure between the pair of the friction elements.

In a further arrangement, the remote operating lever unit preferably comprises a biasing means for returning the lever to the neutral position when the lever is released.

In a further arrangement, the control unit preferably includes a user profile managing means for recording one or more user profiles in a memory in the control unit and reading a requested user profile from the memory.

The invention also provides a brake system comprising the remote operating lever unit and at least one brake unit which receives the signal from the remote operating lever unit indicating the displacement amount of the lever from the neutral position thereof and applies a braking force corresponding to the brake control signal, to at least one wheel of a wheeled vehicle.

The invention also provides a method of repositioning the lever of the remote operating unit. The method includes steps of removing the main body from the holder, and the re-connecting the main body to the holder via the connecting portion at which a desired position of the lever is acquired.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings of which:

FIG. 7 shows different positions of a lever of the remote operating lever unit of the FIG. 1A, in which

FIG. 11 shows two different neutral positions of the lever of FIG. 1A, in which

DETAILED DESCRIPTION OF THE INVENTION

In the illustrated embodiment, a brake system is applied to a bicycle 100 as an example of a wheeled vehicle, but it should be understood that the brake system is not limited to bicycles and may also be applied to other wheeled vehicles such as tricycles, hand-bikes, wheelchairs, other mobility items and the like. Wheeled vehicles include not only those which are powered by human interaction, but also those which are fully or partially powered by a power source such as at least one electric motor, engine or the like.

Figure 1A:
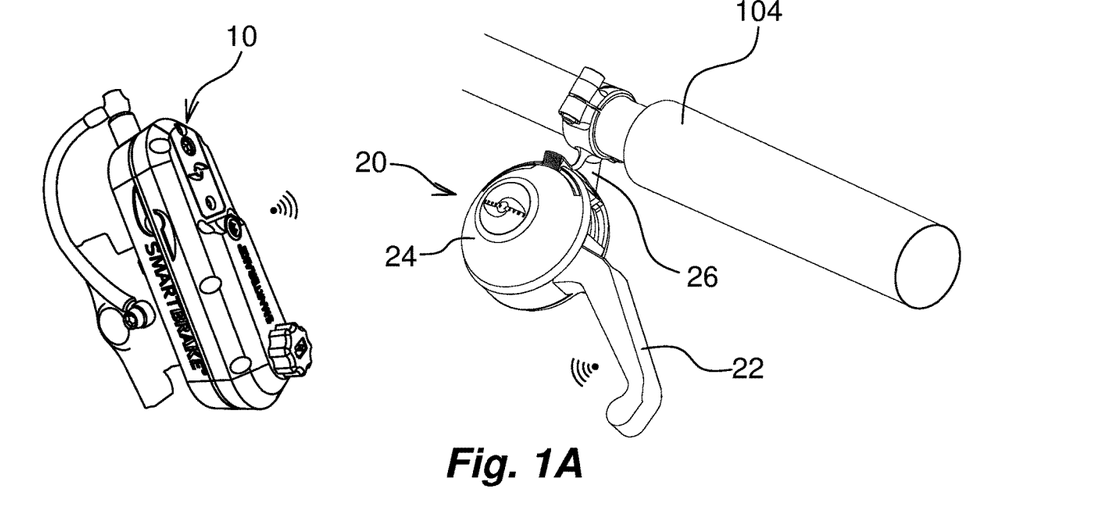
FIG. 1A shows an exemplary remote operating lever unit mounted on a handlebar of a bicycle and a part of an exemplary brake unit.
Figure 1B:
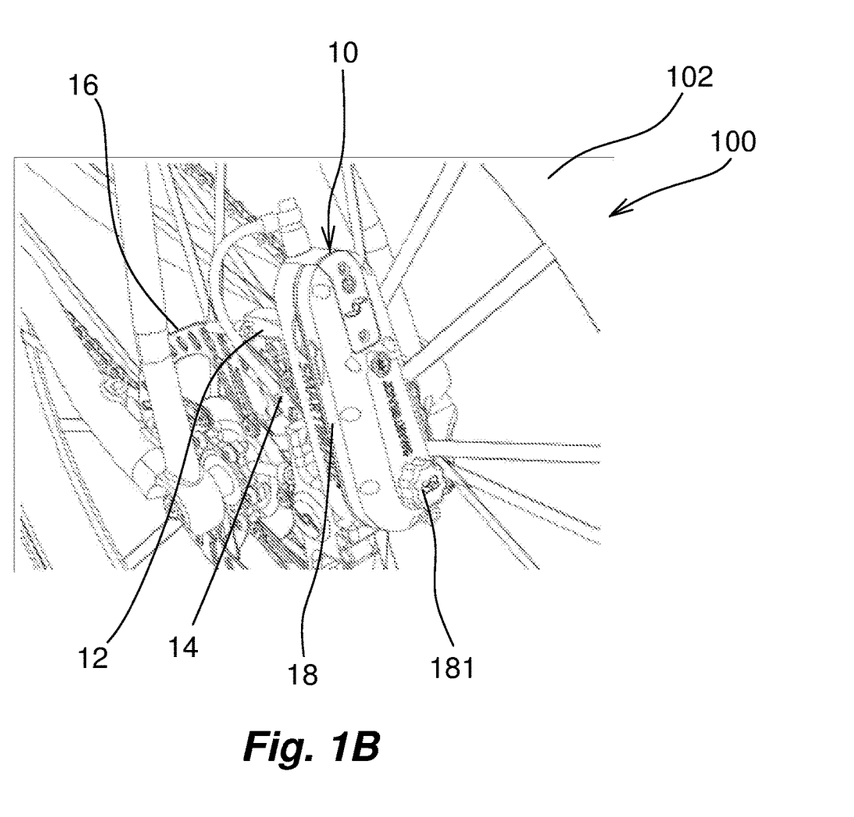
FIG. 1B shows the brake unit of FIG. 1A mounted on a wheel of the bicycle.

The brake system comprises at least one brake unit 10 mounted to a wheel of the wheeled vehicle, shown is the rear wheel 102 of the bicycle 100, as shown in FIG. 1B to apply a braking force to the wheel 102. In FIG. 1A, the brake system further comprises at least one remote operating lever unit 20 for operating the brake unit 10. In a case where a wheeled vehicle has a plurality of wheels, more than one brake units 10 may be mounted. In the example of the bicycle 100, the brake unit 10 may be mounted to each of the front and rear wheels 102. The plurality of brake units 10 may be operated by more than one remote operating lever units 20 respectively, or by the single remote operating lever unit 20. In the example where two brake units 10 are mounted to the bicycle 100, one brake unit 10 mounted to the front wheel may be associated with one remote operating lever unit 20 mounted to the right side of a handlebar 104 of the bicycle 100, and the other brake unit 10 mounted to the rear wheel 102 may be associated with the other remote operating lever unit 20 mounted to the left side handlebar 104. In another example, both of the brake units 10 mounted to the front and the rear wheels 102 may be operated with a single remote operating lever unit 20 provided on either the right or left side of the handlebar 104 of the bicycle 100.

FIG. 1A shows a remote operating lever unit 20 in accordance with the principles of the present invention. In FIG. 1A, the remote operating lever unit 20 is mounted to the handlebar 104 as a mounted object of a wheeled vehicle.

The remote operating lever unit 20 mainly includes a lever 22 that is to be operated by a user, particularly gripped by the user's hand, a main body 24 displaceably or pivotally supporting the lever 22 in a plane, and preferably, a holder 26 mounted to the handlebar 104 of the bicycle 100 and ideally detachably holding the main body 24.

The main body 24 includes a control unit (not shown) transmitting an electric signal to the brake unit 10 based on a displacement amount or stroke of the lever 22 from a neutral position thereof. In FIG. 1A, the lever 22 is shown in a neutral position, where the lever 22 is not operated by a user. In this position, the control unit of the remote operating lever unit 20 does not transmit any signal requesting the brake unit to be activated, or transmits a signal to the brake unit 10 indicating that the displacement amount is zero.

Figure 2:
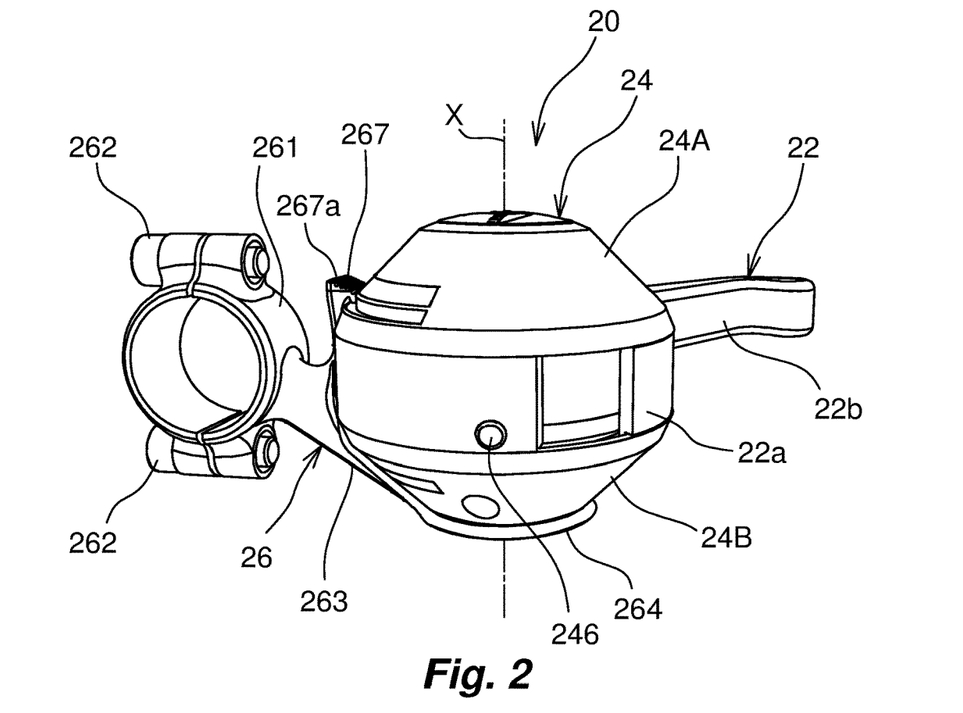
FIG. 2 shows a perspective view of the remote operating lever unit of FIG. 1A.
Figure 3:
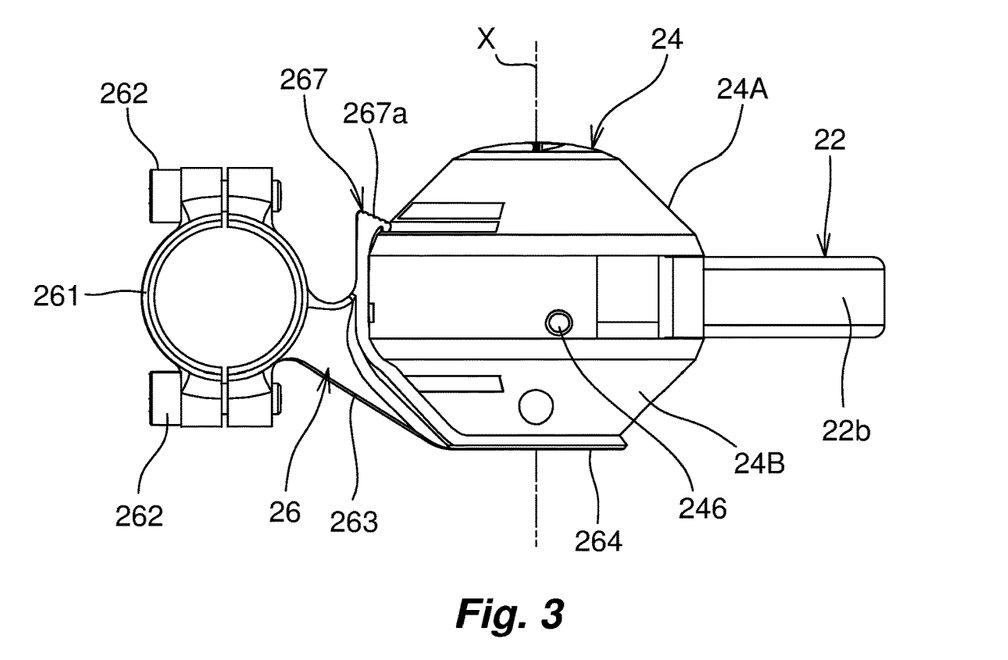
FIG. 3 shows a right view of the remote operating lever unit of FIG. 1A.
Figure 4:
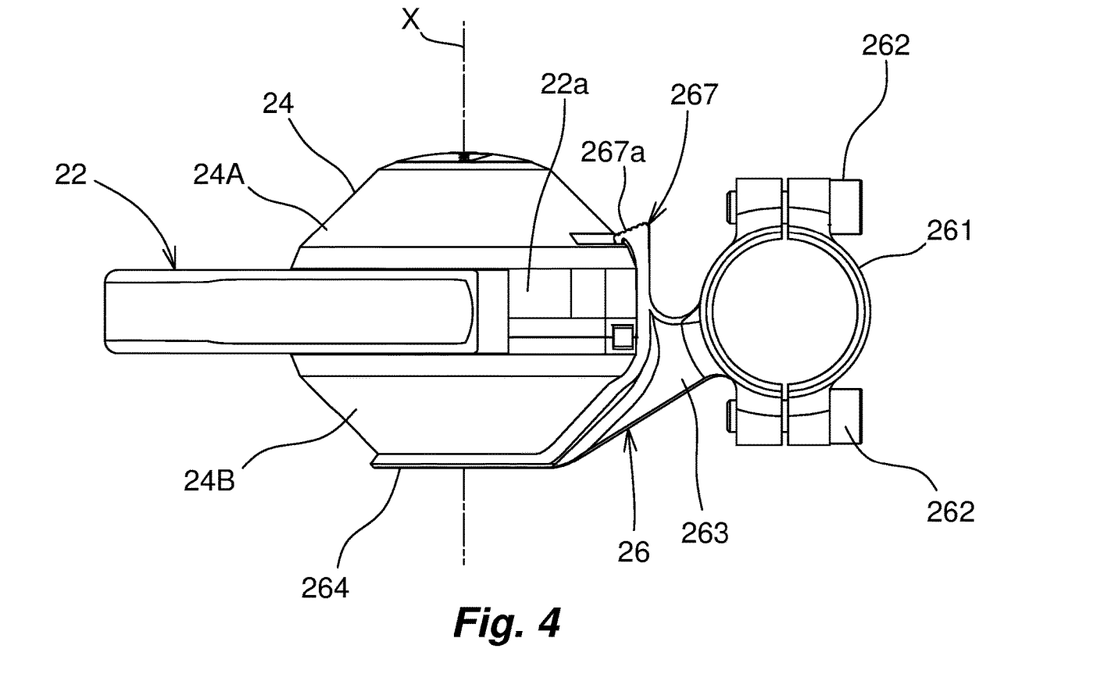
FIG. 4 shows a left view of the remote operating lever unit of FIG. 1A.
Figure 5:
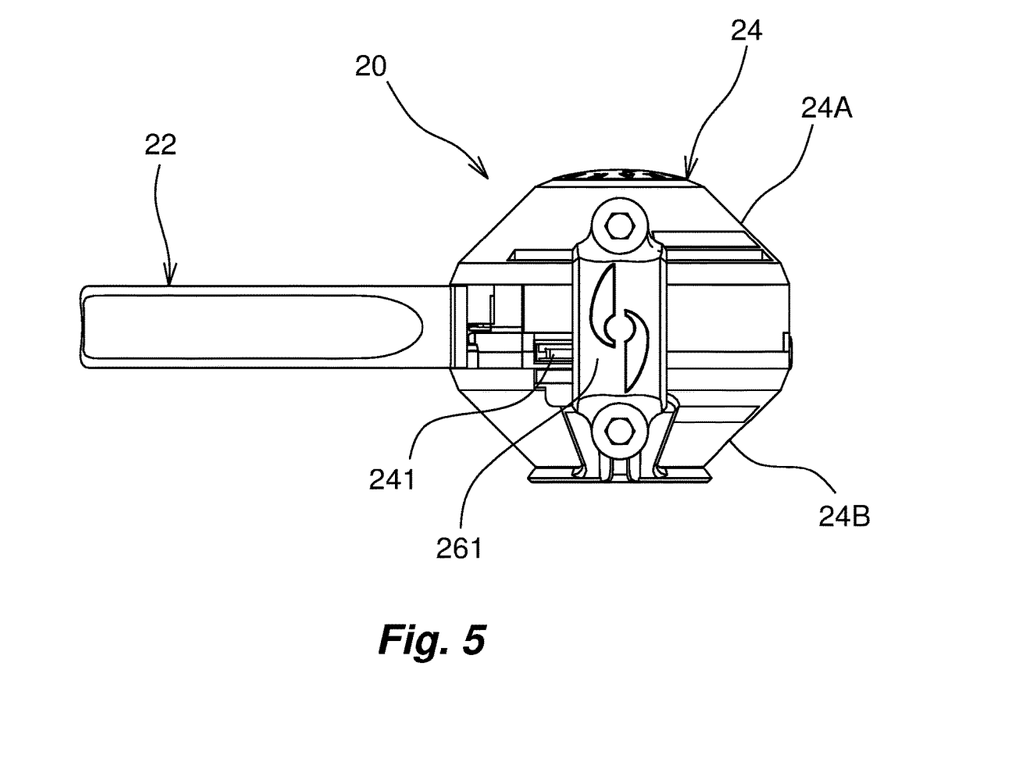
FIG. 5 shows a back view of the remote operating lever unit of FIG. 1A.
Figure 6:
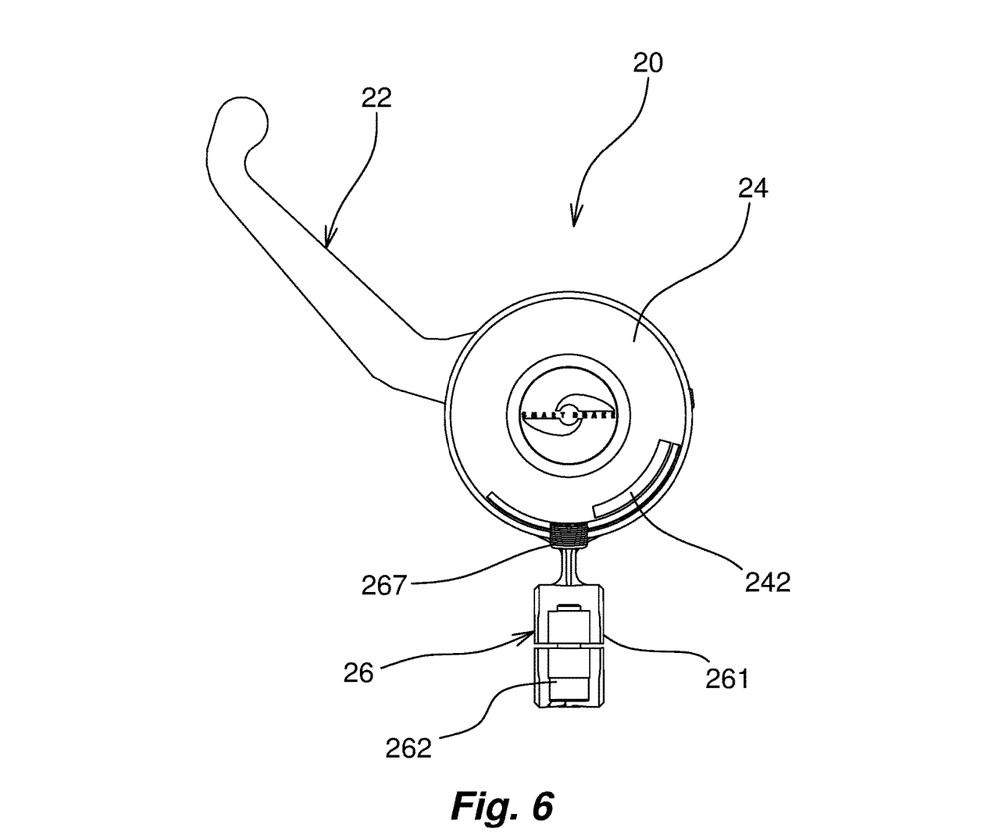
FIG. 6 shows a top view of the remote operating lever unit of FIG. 1A.

FIG. 2 shows a perspective view of one example of the remote operating lever unit 20. FIG. 3 shows a right side view of the remote operating lever unit 20. FIG. 4 shows a left side view of the remote operating lever unit 20. FIG. 5 shows a back view of the remote operating lever unit 20. FIG. 6 shows a top view of the remote operating lever unit. These figures detail that the main body 24 has an upper housing 24A and a lower housing 24B. The upper housing 24A and the lower housing 24B are coupled to each other via a known fixing means, such as a screw, bonding, welding, fitting or the like. The upper housing 24A and the lower housing 24B are formed in a roughly truncated conical outer shape, but the shapes of the upper and housings 24A, 24B are not limited thereto. It is preferable that the main body 24 has a shape that can be securely held by the holder 26.

The lever 22 is arranged between the upper housing 24A and the lower housing 24B of the main body 24. The lever 22 may be pivoted about an axis X, so as to allow a rotatory movement of the lever 22 in the plane. Alternatively, the lever 22 may be adapted to slide in a direction approaching to, or away from, the handlebar 104 of the bicycle 100. In the illustrated example, the lever 22 is pivotally supported between the upper housing 24A and the lower housing 24B, so as to rotate about the axis X in a direction approaching to, or away from, the handlebar 104. The axis X may coincide with a centerline passing through the upper housing 24A and the lower housing 24B of the main body 24. The base portion 22*a* of the lever 22 is disposed between the upper housing 24A and the lower housing 24B, the rest portion 22*b* of the lever 22 projects laterally from the main body 24.

The lever 22 may be biased toward the neutral position, as viewed from the handlebar 104, by a biasing means (not shown) provided in the main body 24. This allows the lever 22 to automatically return to the neutral position when a user releases the grip operation of the lever 22. The biasing means may be an elastic member such as a spring or rubber. The biasing means may be a magnet which applies a magnetic force, so that the lever 22 returns to the neutral position.

The biasing means may have a nonlinear characteristic in which the spring constant increases in accordance with increase of compressed amounts. This allow a user to have same operational feeling as the wire connected type brake system, whose lever resistance to pulling increases as the lever is pulled.

In another example, the biasing means may comprise a spring which pushes the lever 22 toward the neutral position, and a pre-load applying means which applies pre-load to the spring. The pre-load applying means may be a threaded adjustment bolt which is screwed through the housing of the main body 24, and provides adjustable pre-load in accordance with the screwed distance into the housing.

The increased lever resistance to pulling gives a comfortable operability to adult or people with enough handgrip strength. On the other hand, in case of setting the pre-load to lower or zero, the lever resistance to pulling respectively becomes lower, whereby children or people with limited handgrip strength can easily pull the lever 22.

The biasing means is, of course, not indispensable. The important thing is that the lever 22 is not mechanically connected to the brake unit 10 via a brake wire. This lack of wire connect ensures that the lever 22 is easy to pull, making the remote operating lever unit 20 perfect for children and people with limited (<10%) handgrip strength.

The main body 24 may comprise a variable resistive element to adjust the lever resistance to pulling. The variable resistive element may include a pair of friction elements and a variable pressure means. One friction element may be connected to the lever 22, and the other friction element may be connected to the housing of the main body 24. The variable pressure means may apply a contact pressure between the pair of friction elements to generate the resistance to pulling. The variable pressure means may be a threaded adjustment bolt which is screwed through the housing of the main body 24 and provides adjustable pressure in accordance with the screwed distance into the housing. A detector for detecting a rotation angle or movement amount, i.e., the displacement amount of the lever 22 from the neutral position thereof is preferably provided. In one example, the detector may be a potentiometer or a variable resistor that converts the rotation angle or the amount of movement of the lever 22 from the neutral position thereof into a voltage. The detector is not limited thereto and may be a rotary encoder, a magnetic sensor, an inductive sensor, a contact sensor, or the like.

The control unit provided in the main body 24 comprises a processor such as a CPU (Central Processing Unit), memories such as a ROM (Read Only Memory) and RAM (Random Access Memory), a transmitter, and a power supply circuit. These elements are mounted on or formed in a printed circuit board provided in the housing of the main body 24.

The CPU calculates a signal indicating the operation amount or displacement amount of the lever 22 from the neutral position thereof, and transmits the signal to the brake unit 10 via the transmitter, by executing programs stored in the ROM. The RAM is a readable/writable memory device in connection with the CPU.

The transmitter includes an RF module and RF antenna. In one example, the transmitter includes a Bluetooth module and Bluetooth antenna to realize short-range wireless communication with the brake unit 10. The transmission of the signal, from the transmitter of the remote operating lever unit 20 to a corresponding receiver of the brake unit 10, is not limited to the wireless communication and may be configured through a wired signal transmission. Transmitter may be long-range communication device based on a long-range protocol. The communication range can be extended up to 200 m or more. This expand the user value of a parent control, i.e., a remote control that is not connected to the wheeled vehicle such as bike, wheelchair, but carried by a parent/companion, or mounted on the parent's bike, as described later.

The power supply circuit generates a suitable voltage for each circuit part from a battery arranged in the main body 24, and which supplies the generated voltage to each circuit part. The battery is preferably a rechargeable battery. The battery may be charged via a connection port 241 which may be located on the side of the main body 24, as shown in FIG. 5. In one example, the connection port 241 may be a USB or micro USB dock or port. The connection port 241 may be further adapted to receive a connection from an external source, such as a computer, smartphone, or the like, wherein the external source may be used to configure the settings or to update the control unit of the remote operating lever unit 20.

Further, the control unit may comprise a receiver adapted to receive a connection from the brake unit 10 and/or an external source such as a computer, smartphone, or the like, wherein the external source may be used to configure the settings or to update the control unit of the remote operating lever unit 20.

Moreover, as shown in FIG. 6, a light element 242 such as an LED perhaps with RGB elements, may be provided on the main body 24 to indicate a normal operating condition, a power failure condition, a signal loss condition, or the like. Equally, the remote operating lever unit 20 may be provided with a display to display any number of parameters. The remote operating lever unit 20 may also be equipped with a GPS receiver and the decoded location information may be displayed on the display.

Figure 7A:
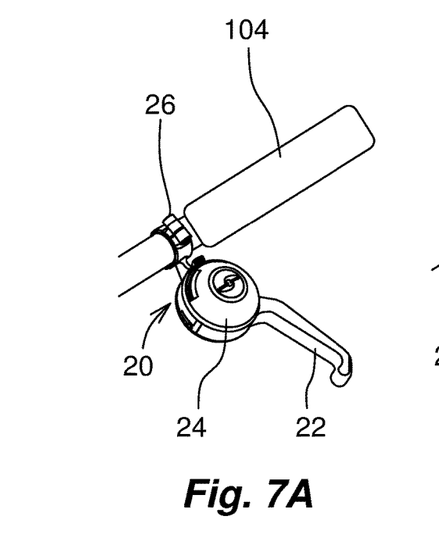
FIG. 7A shows a park brake position of the lever.
Figures 7B, 7C:
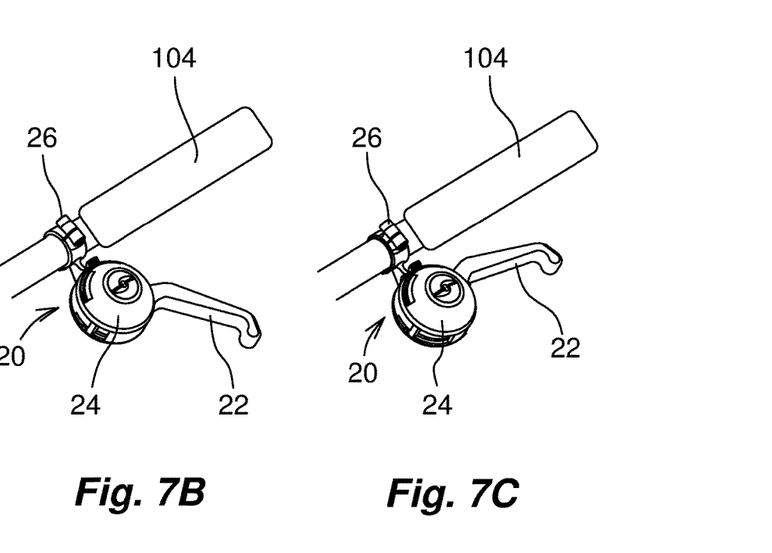
FIG. 7B shows a neutral position of the lever and FIG. 7C shows a full brake position.

FIG. 7 shows, in addition to the neutral position, two different positions where the lever 22 of the operation unit 20 can locate from the neutral position by a user. In FIG. 7C, the lever 22 is operated from the neutral position (FIG. 7B) to a full brake position in a first direction, i.e., toward the handlebar 104 of the bicycle 100. Accordingly, an electric signal corresponding to the operation amount of the lever 22 is transmitted to the brake unit 10 by the control unit of the remote control unit 20. It should be understood that the full brake position is the position of the lever 22 where a user pulls the lever 22 to the extent that the lever 22 does not contact or interfere with the handlebar 104. Therefore, the full brake position does not necessarily mean a mechanically restricted position. However, a mechanical stopper for the pull brake position may be provided. The mechanical stopper may be adjustable so as to increase or decrease the available travel of the lever 22 to the user. Particularly such adjustment may be made in association with the repositioning of the lever 22. The stopper may be a screw or pin.

In FIG. 7A, the lever 22 is moved from the neutral position (FIG. 7B) in a second direction opposite to the first direction and is located in a park brake position. When the lever 22 is operated to the park brake position, the control unit of the remote operating lever unit 20 transmits an electric signal to turn on the parking brake or parking brake functionality to the brake unit 10. However, the lever 22 may be configured to be located at the neutral position and the brake operation position only, and a separate switch for turning on the parking brake may be provided on the main body 24 instead.

Returning to FIGS. 2 to 4, the holder 26 comprises a circular mounting portion 261 which surrounds the handlebar 104 of the bicycle 100. The mounting portion 261 may be fastened to the handlebar 104 with screws 262 or the like. An extension wall 263 is provided from the mounting portion 261, the extension wall 263 extending in a frontward and obliquely downward direction. A support plate 264, on which the main body 24 is placed, is provided at the front end of the extension wall 263.

Figure 8:
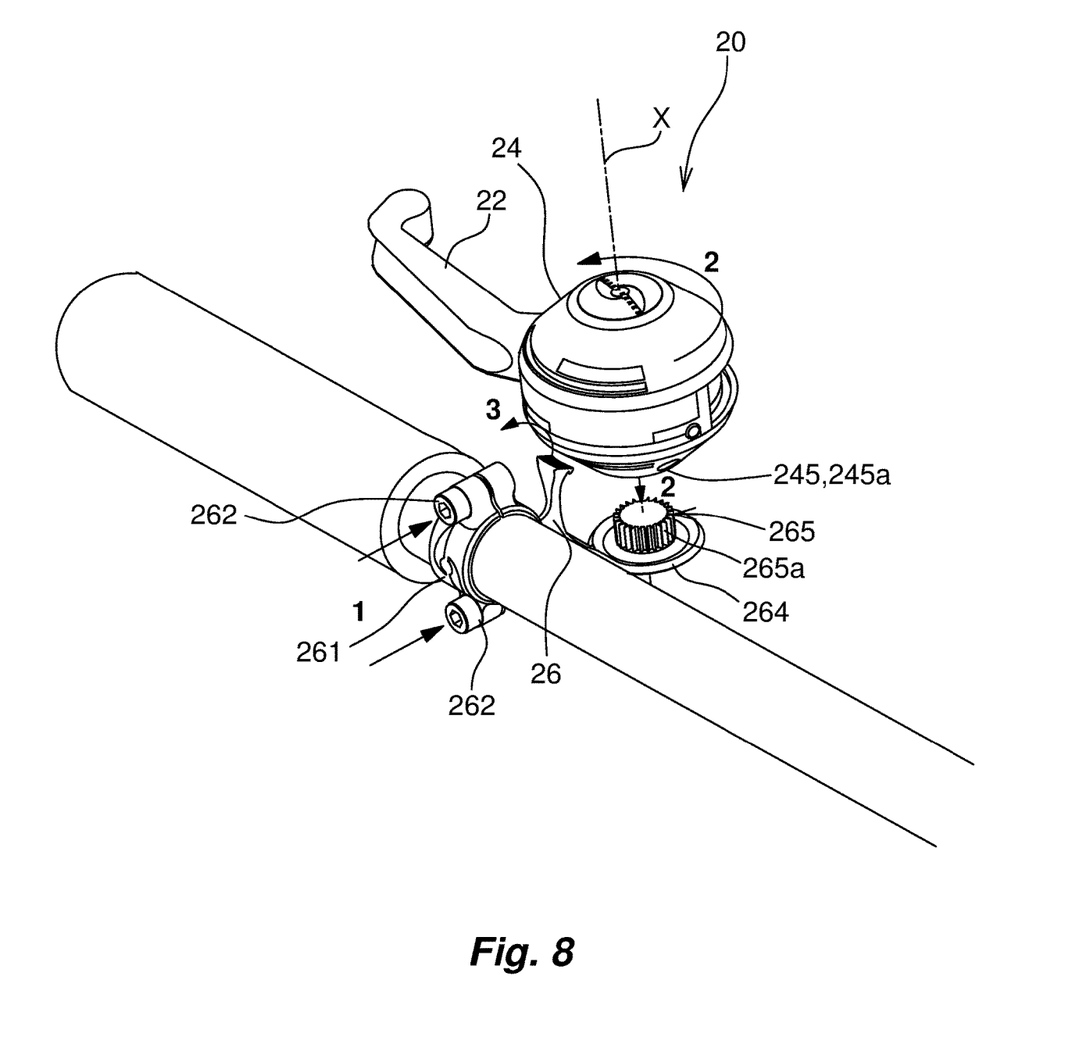
FIG. 8 shows a method of adjusting the neutral position of the lever of the remote operating lever unit of FIG. 1A, by using a connecting portion.

In FIG. 8, a protruding part 265 is formed, along an axis perpendicular to the movement plane of the lever 22, on the upper surface of the support plate 264. The protruding part 265 preferably extends along the rotation axis X of the lever 22. In one example, the protruding part 265 is cylindrical. One or more male splines (teeth) 265a are preferably formed on the outer peripheral surface of the protruding part. The one or more male splines 265a preferably extend along the axis X.

In correspondence with the protruding part 265, a recessed part 245 for receiving the protruding part 265 is formed on the lower surface of the main body 24. The recessed part is formed along an axis perpendicular to the movement plane of the lever 22. The recessed part 245 preferably extends along the rotation axis X of the lever 22. One or more female splines (teeth) 245a, sized and shaped to engage with the male splines 265a, are preferably formed on the inner peripheral surface of the recessed part 245. The one or more female splines 245a preferably extend along the axis X.

These protruding and recessed parts 265, 245 constitute a connecting portion that detachably engages the main body 24 and the holder 26 at an arbitrary angle around the axis perpendicular to the plane in which the lever 22 displaces.

Although not shown in the drawings, the protruding part 265 with the one or more male splines 265a may be provided on the lower surface of the main body 24, and the corresponding recessed part 245 with the one or more female splines 245a may be provided on the support plate 264.

In a preferred arrangement, the protruding part 265 is formed integrally with the holder 26 or the main body 24; and the recessed part 245 is formed integrally with the main body 24 or the holder 26.

The connecting portion is not limited to the protruding part 265 and the recessed part 245 each having one or more splines 265a, 245a. For example, the connecting portion may include one or more protrusions provided on the support plate 264 at predetermined intervals along a circle centered on the rotation axis X of the lever 22, and one or more holes provided on the lower surface of the main body 22 adapted to receive the one or more protrusions. When the one or more protrusions on the support plate 264 is guided into the one or more holes of the main body 22 in a desired neutral position of lever 22, the neutral position of the lever 22 will be set. In another arrangement, the one or more protrusions may be provided on the lower surface of the main body 24 and the corresponding holes may be provided on the support plate 264 of the holder 26.

Figure 9:
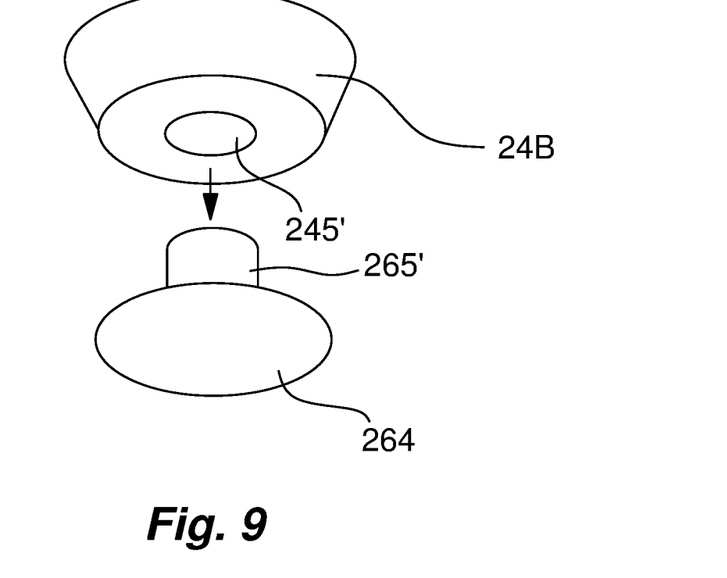
FIG. 9 shows another example of the connecting portion.

In another example shown in FIG. 9, the connecting portion may comprise a cylindrical part 265' extending along the axis X, a circular recessed part 245' sized and shaped to receive the cylindrical part, and a positioning means (not shown). The cylindrical part 265' may be provided on the support plate. The circular recessed part 245' may be provided on the lower surface of the main body 24. The positioning means may be a screw, bolt, lock pin, or the like, to non-rotatably fix the main body 24 and the holder 26 at an arbitrary angle around the axis X.

According to this arrangement, the neutral position of the lever 22 can be adjusted by a finer angle or in a continuous manner.

Figure 10:
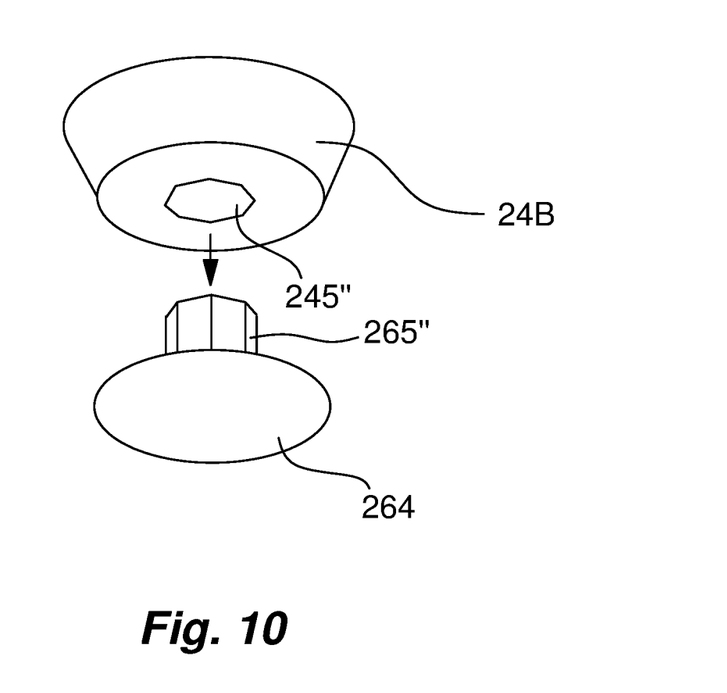
FIG. 10 shows yet another example of the connecting portion.

In yet another example shown in FIG. 10, the connecting portion may comprise a polygonal column part 265" extending along the axis X, a polygonal recessed part 245" sized and shaped to receive the polygonal column part 265". The polygonal column part 265" may be provided on the support plate 264. The polygonal recessed part 245" may be provided on the lower surface of the main body 24. According to this arrangement, said positioning means is no longer required, as the polygonal column part 265" and the polygonal recessed part 245" engage with each other in a circumferential direction.

Returning to FIGS. 2 to 4, in an advantageous arrangement, the holder 26 has a lock portion 267 that engages to the outer surface of the main body 24, preferably to the outer surface of the upper housing 24A of the main body 24, and maintains the connected state through the connecting portion between the main body 24 and the holder 26. This makes it possible to reliably maintain the connected state between the main body 24 and the holder 26 during use. To adjust the neutral position of the lever 22, the engagement of the lock portion 267 is released so that the main body 24 can be lifted from the holder 26. The lock portion 267 preferably has a pin shape. An undercut or hook 267a to be engaged with the outer surface of the main body 24 is further preferably formed at a distal end of the lock portion 267. The lock portion 267 may be formed so as to be elastically deformable. Advantageously, the lock portion 267 extends upwardly from the extension wall 263 and is arranged on the rear side of the main body 24. As a result, when the lever 22 is pulled toward the handlebar 104, the force generated in the main body 24 can be received by the lock portion 267, and the operation of the lever 22 is stabilized.

FIG. 8 shows a method for arbitrarily adjusting the neutral position of the lever 22 by a user according to the principle of the present invention. The method of mounting the remote operating lever unit 20 to the handlebar of the bicycle 100 and adjusting the neutral position of the lever 22 includes the following steps.

1) A step of mounting the holder 26 to the handlebar 104. If two remote operating lever units 20 are mounted, both holders 26 are preferably mounted at an equal tilt to the handlebar 104.

2) A step of guiding the recessed part 245 onto the protruding part 265 and engaging the one or more female splines 245a and one or more male splines 265a.

In this step, the distance between handlebar 104 and the lever 22 in a neutral position shall be adjusted to the individual user. Preferably, the lock portion 267 is engaged with the outer surface of the main body 24 after the neutral position of the lever 22 is set.

3) To re-position the neutral position of the lever 22, the engagement between the lock portion 267 and the main body 24 is released by pressing the lock portion 267 towards the handlebar 104 to be away from the main body 24, and the main body 24 is lifted from the holder 26. It returns to the step 2).

Figure 11A:
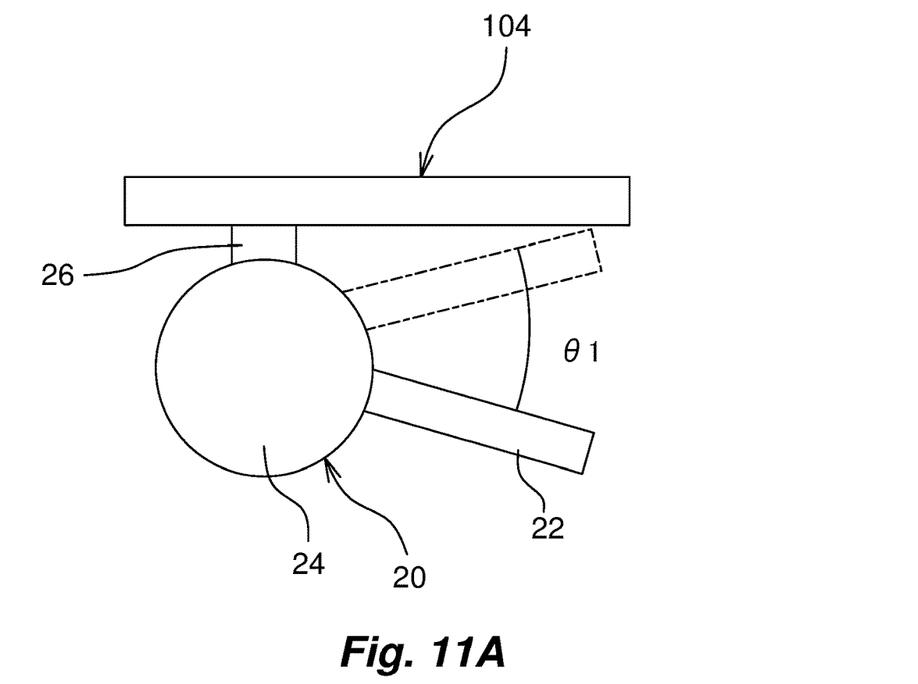
FIG. 11A shows the neutral position of the lever adjusted for a large hand/grip size and FIG. 11B shows the neutral position of the lever adjusted for a smaller hand/grip size.
Figure 11B:
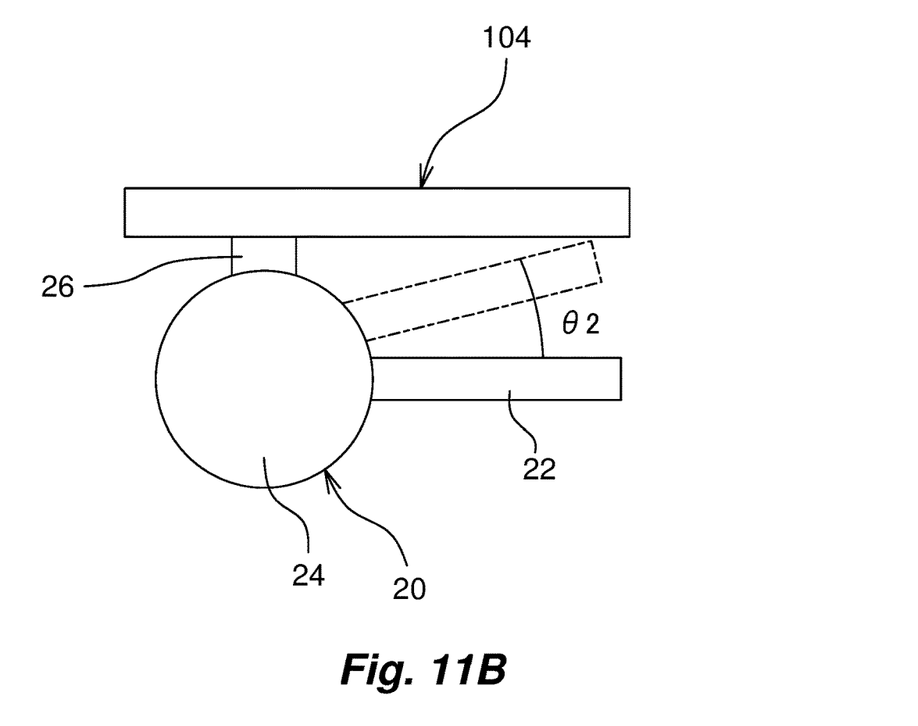

Adjustment of the neutral position of the lever 22 means a change in the movable range or stroke of the lever 22 between the neutral position and the full brake position. For example, as shown in FIG. 11A, a movable range 81 of the lever 22 for an adult user defined between the neutral position and the full brake position can be about twice a movable range 82 for a child user shown in FIG. 11B. Therefore, in the case where the neutral position of the lever 22 is adjusted to a large degree from FIG. 11A to FIG. 11B for example, even if the child user draws the lever 22 to the full brake position, the displacement amount of the lever 22 becomes in fact only about half of the amount of the full brake. Accordingly, when the neutral position is adjusted to the large degree, the braking force generated in the brake unit 10 may become excessive or smaller than expected.

Therefore, in an advantageous arrangement, the remote control unit 20 comprises a calibration means for calibrating the signal to be generated based on the displacement amount of the lever 22 from the neutral position. The change in a movable range of the lever 22 from the neutral position to the full brake position, as a result of adjustment of the neutral position of the lever 22 via the connecting portion, is considered so that satisfactory operation of the brake unit 10 can be assured.

After adjustment of the neutral position of the lever, the calibration means reconstructs the correspondence between the displacement amount from the neutral position of the lever 22 and the electric signal to be sent to the brake unit 10, taking a new movable range between the neutral position of the lever 22 and the full brake position into account. That is, with this calibration the full brake position after adjustment of the neutral position of the lever 22 is re-set as a regular full brake position. The function of the calibration means is provided by the control unit of the main body 24.

An example of the calibration method includes the following steps.

1) A step of, after adjusting the neutral position of the lever 22, pulling the lever 22 from the neutral position to a new full brake position.

2) A step of, with the lever 22 pulled to the new full brake position, pressing a calibration button 246 (see FIG. 2) which may be provided on the side of the main body 24.

3) A step of measuring a new movable range or angle between the neutral position and the new full brake position with the detector for example, and reconstructing the correspondence between the displacement amount of the lever 22 and the electric signal for the brake unit 10 with the measured movable range or angle as calibrated to 100%.

By performing such calibration, even after a large adjustment of the neutral position of the lever 22, satisfactory operation of the brake unit 10 can be assured.

Instead of measuring said new movable range or angel by the detector, it may be determined from a positional relationship between the main body 24 and the holder 26 after the adjustment. Electrical contacts may be provided on the splines 245a, 265s to detect the positional relationship between the main body 24 and the holder 26. In one example, one or more first electrical contacts may be provided on the male splines 265a; one of more second electrical contacts may be provided on the female splines 245a. The positional relationship is determined by the CPU of the control unit of the remote operating lever unit 20, depending on which first electrical contact and which second electrical contact are connected.

In an arrangement, the control unit of the remote operating lever unit 20 may be provided with an accelerometer. The accelerometer may be constituted, for example, by a triaxial gyrosensor. The control unit of the remote operating lever unit 20 is arranged to transmit a signal to turn on the parking brake or parking brake functionality to the brake unit 10 when the output signal from the accelerometer does not substantially change, or does not exceed a predetermined threshold, over a predetermined time. Accordingly, the brake unit 10 automatically turns on the parking brake. This function will come in handy in many situations, and especially for the companion that may need the wheeled vehicle to stand still while helping the user and may have forgotten to activate the parking brake.

The control unit of the remote operating lever unit 20 may comprise a user profile managing means for recording one or more user profiles in the memory and reading a requested user profile from the memory. The user profile managing means may be provided by the CPU in the control unit of the remote operating lever unit 20. It is preferable that the user profile managing means records calibration data from the calibration means as the user profile. According to this arrangement, the calibration process can be simplified or no longer required. Other data, such as hand sizes and gripping forces of users may also be recorded as the user profile. Such data can be used by the CPU to calculate optimum parameters for individual users, such as optimal neutral and full brake positions of the lever 22, optimal resistance to pulling the lever 22, or the like.

One or more input parts, such as push buttons or touch panel, to operate at least the user profile managing means may be provided on the main body 24.

It will thus be understood that an advantageous structure according to the present invention is that a combination of: the detachable structure of the main body 24 and the holder with the connecting portion; the calibration means for calibrating the signal to operate the brake unit 10; and/or the biasing means for returning the lever 22 to the neutral portion.

The combination of the mechanical reposition of the lever 22 via the connecting portion and the electrical recalibration by the calibration means ensures an easy repositioning of the lever 22 for individual users with the full and tailored control of the brake unit 10, being able to set 100% braking to occur before the lever 22 hits the handlebar 104. Further, the combination of the mechanical reposition via the connecting portion and the biasing means offers numerous advantages to the user. Since the lever 22 is kept at one portion when being released, the user can easily arrange the lever 22 at a desired position during the mechanical repositioning of the lever 22 via the connecting portion. In addition, a safer remote operating lever unit 20 can be provided, as the lever 22 automatically returns to the neutral position at which the brake does not act on the wheel. Thereby, an unexpected braking is prevented while riding. Returning to FIG. 1B, the brake unit 10 is mounted on the rear wheel 102 of the bicycle 100. In one arrangement, the brake unit 10 may be a hydraulic brake unit 10 and comprise a brake piston 12, a pump 14 and a brake disc 16, wherein the brake piston 12 is provided so as to actuate against the brake disc 16 via a pumped hydraulic brake fluid and provide a braking force thereto. When the brake piston 12 is actuated, the braking force causes the rear wheel 102 to slow down.

An alternative for the one or more brake units 10 is to use an eddy-current braking means. In this sense, an electric motor may be employed as the one or more brake units. In one configuration, a brake disc is integrated with the rim of one or more of wheels. Such rim is adapted to produce an eddy-current in response to a magnetic field applied thereto. In the correct configuration, i.e., current direction and direction of magnetic field, a resistive force may be generated to oppose the rotary motion of the brake disc.

The brake unit 10 further comprises a control unit 18, which is adapted to receive the signal from the remote operating lever unit 20 and actuate the pump 14 to compress the hydraulic brake fluid in accordance with the amount indicated by the remote operating lever unit 20.

The control unit 18 of the brake unit 10 comprises a processor such as a CPU (Central Processing Unit), memories such as a ROM (Read Only Memory) and RAM (Random Access Memory), a receiver, and a power supply circuit. These elements are mounted on or formed in a printed circuit board provided in the control unit 18.

The CPU, by executing programs stored in the ROM, controls the pump 14 so that the braking force is generated in the brake disc 16 based on the signal from the remote operating lever unit 20 indicating the displacement amount of the lever 22. The RAM is a readable/writable memory device in connection with the CPU.

The receiver includes an RF module and RF antenna. In one example, the receiver includes a Bluetooth module and Bluetooth antenna to realize short-range wireless communication with the remote operating lever unit 20.

The power supply circuit generates a suitable voltage for each circuit part from a battery that can be arranged in the brake unit 10 and supplies the generated voltage to each circuit part. The battery is preferably a rechargeable battery. The battery may be charged via a connection port 181. In one example, the connection port 181 may be a USB or micro USB dock or port. In one example, an external power source may be used to charge the battery, but regenerative energy from the wheel 102 of the bicycle 100 may be used. The connection port 181 may be further adapted to receive a connection from an external source, such as a computer, smartphone, or the like, wherein the external source may be used to configure the settings or to update the control unit.

Further, the control unit 18 may comprise transmitter. Such transmitter can be used to transmit a signal indicating the state of the brake unit 10 to the remote operating lever unit 20 and/or to an external device such as a computer, smartphone, or the like.

Figure 12:
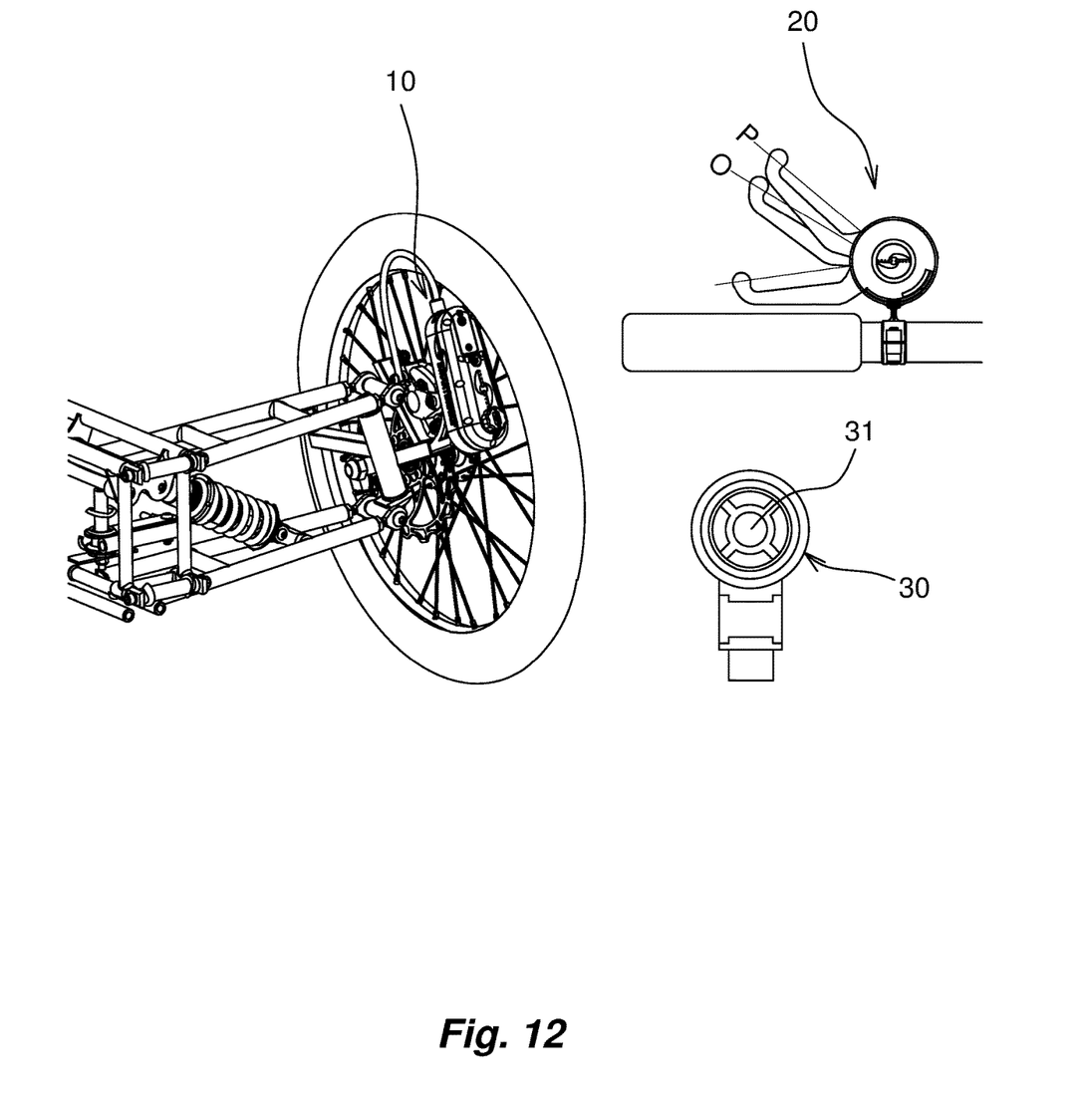
FIG. 12 shows further embodiment of a brake system according to the present invention.

FIG. 12 illustrate further embodiment of a brake system according to the present invention. The brake system includes the remote operating lever unit 20 mounted on the wheeled vehicle, at least one brake unit 10 mounted on the wheel of the wheeled vehicle and applies a braking force based on the signal from the remote operating lever unit 20, and a parent control 30, i.e., a remote control not mounted on the wheeled vehicle. The parent control 30 may be carried by a person other than the rider or driver of the wheeled vehicle, such as a parent or companion, and configured to control or operate the brake unit 10 in an auxiliary or alternative manner. To this end, the parent control 30 includes an operation part 31 such as a push-button switch and a control unit (not shown) transmitting an electric signal to the brake unit 10, based on an ON/OFF operation of the operation part 31 or operation amount of the operation part 31. The control unit of the parent control 30 includes a transmitter. In one example, the transmitter includes a Bluetooth module and Bluetooth antenna to realize short-range wireless communication with the brake unit 10. As another example, the transmitter may be based on a long-range wireless protocol having a longer communication distance than the Bluetooth communication. The transmitter may be configured to transmit the signal over a communication distance equal to or more than 200 meters. The parent control 30 can be configured to operate in parallel with the remote operating lever unit 20 mounted on the vehicle, and provide both active brake and parking brake.

This function is highly valuable for some users, especially kids and disabled needing assistance during activity.

Although the invention has been derived with reference to particular illustrative embodiments thereof, many changes and modifications of the invention may become apparent to those skilled in the art without departing from the sprit and scope of the invention.

The invention claimed is:

1. A remote operating lever unit for operating a brake unit mounted to a wheeled vehicle, comprising:
a lever for operation by a user;
a main body holding the lever in a displaceable manner and including a control unit for transmitting a signal to the brake unit based on a displacement amount of the lever from a neutral position thereof;
a holder holding the main body; and
a connecting portion detachably engaging the main body and the holder at an arbitrary angle around an axis (X) perpendicular to a plane in which the lever displaces;
wherein the lever comprises the neutral position, a brake operation position where the lever is displaced in a first direction from the neutral position by a user, and a park brake position where the lever is displaced in a second direction opposite to the first direction, and the control unit of the remote operating lever unit transmits a signal for turning on a parking brake to the brake unit when the lever is set to the park brake position.

2. The remote operating lever unit according to claim 1, wherein the connecting portion includes a protruding part provided at one of the holder and the main body along the axis (X) and having one or more male splines on an outer peripheral surface thereof, and a recessed part for receiving the protruding part, the recessed part being provided at the other of the holder and the main body along the axis (X) and having one or more female splines sized and shaped to engage with the male splines on an inner peripheral surface thereof.

3. The remote operating lever unit according to claim 1, wherein the holder comprising a lock portion which is engaged with an outer surface of the main body and maintains a connection state between the main body and the holder via the connection portion.

4. The remote operating lever unit according to claim 1, wherein the main body comprises a variable resistive element to adjust a lever resistance to pulling, the variable resistive element including a pair of friction elements and a variable pressure means for applying a contact pressure between the pair of the friction elements.

5. The remote operating lever unit according to claim 1, further comprising a biasing means for returning the lever to the neutral position when the lever is released.

6. The remote operating lever unit according to claim 1, wherein the control unit includes a user profile managing means for recording one or more user profiles in a memory in the control unit and reading a requested user profile from the memory.

7. A brake system comprising:
the remote operating lever unit according to claim 1; and
at least one brake unit which receives the signal from the remote operating lever unit indicating the displacement amount of the lever from the neutral position thereof, and applies a braking force corresponding to the signal to at least one wheel of a wheeled vehicle.

8. The brake system according to claim 7, further comprising a parent control, wherein the parent control is configured to operate the brake unit in parallel with the remote operating lever unit.

9. A method of repositioning the lever of the remote operating lever unit according to claim 1, including steps of removing the main body from the holder, and re-connecting the main body to the holder via the connecting portion at which a desired neutral position of the lever is acquired.

10. A remote operating lever unit for operating a brake unit mounted to a wheeled vehicle, comprising:
a lever for operation by a user;
a main body holding the lever in a displaceable manner and including a control unit for transmitting a signal to the brake unit based on a displacement amount of the lever from a neutral position thereof;
a holder holding the main body;
a connecting portion detachably engaging the main body and the holder at an arbitrary angle around an axis (X) perpendicular to a plane in which the lever displaces; and
a calibration means for calibrating the signal to be generated based on the displacement amount of the lever from the neutral position, taking a change in a movable range of the lever from the neutral position to a full brake position as a result of adjustment of the neutral position of the lever with respect to and via the connecting portion, into account.

11. The remote operating lever unit according to claim 10, further comprising a relative position detecting means for detecting a positional relationship between the main body and the holder, wherein a change of the positional relationship indicates the change of the movable range of the lever.

12. The remote operating lever unit according to claim 11, wherein the relative position detecting means comprises one or more first electrical contacts provided at the main body and one or more second electrical contacts provided at the holder, and the relative position is detected by the control unit, depending on which first electrical contact and which second electrical contact are connected.

13. A brake system comprising:
the remote operating lever unit according to claim 10; and
at least one brake unit which receives the signal from the remote operating lever unit indicating the displacement amount of the lever from the neutral position thereof, and applies a braking force corresponding to the signal to at least one wheel of a wheeled vehicle.

14. The brake system according to claim 13, further comprising a parent control, wherein the parent control is configured to operate the brake unit in parallel with the remote operating lever unit.

15. A method of repositioning the lever of the remote operating lever unit according to claim 10, including removing the main body from the holder, and re-connecting the main body to the holder via the connecting portion at which a desired neutral position of the lever is acquired.

16. A remote operating lever unit for operating a brake unit mounted to a wheeled vehicle, comprising:
a lever for operation by a user;
a main body holding the lever in a displaceable manner and including a control unit for transmitting a signal to the brake unit based on a displacement amount of the lever from a neutral position thereof;
a holder holding the main body;
a connecting portion detachably engaging the main body and the holder at an arbitrary angle around an axis (X) perpendicular to a plane in which the lever displaces; and
wherein the control unit of the remote operating unit comprises an accelerometer, and the control unit is configured to transmit a signal for turning on a parking brake or parking brake functionality to the brake unit when an output signal from the accelerometer does not change, or does not exceed a predetermined threshold, over a predetermined amount of time.

17. A brake system comprising:
the remote operating lever unit according to claim 16; and
at least one brake unit which receives the signal from the remote operating lever unit indicating the displacement amount of the lever from the neutral position thereof, and applies a braking force corresponding to the signal to at least one wheel of a wheeled vehicle.

18. The brake system according to claim 17, further comprising a parent control, wherein the parent control is configured to operate the brake unit in parallel with the remote operating lever unit.

19. A method of repositioning the lever of the remote operating lever unit according to claim 16, including removing the main body from the holder, and re-connecting the main body to the holder via the connecting portion at which a desired neutral position of the lever is acquired.

* * * * *